(12) United States Patent
Deniau

(10) Patent No.: US 6,402,963 B2
(45) Date of Patent: Jun. 11, 2002

(54) DRAINING WALL

(75) Inventor: Alain Maurice Deniau, Creteil (FR)

(73) Assignee: Soletanche Bache France, Nanterre (FR)

(*) Notice: Subject to any disclaimer, the term of this patent is extended or adjusted under 35 U.S.C. 154(b) by 0 days.

(21) Appl. No.: 09/770,495

(22) Filed: Jan. 29, 2001

(30) Foreign Application Priority Data

Feb. 2, 2000 (FR) .............................................. 00 01302

(51) Int. Cl.$^7$ ................................................ E02B 11/00
(52) U.S. Cl. ........................ 210/747; 210/170; 405/36; 405/43; 405/50; 405/267
(58) Field of Search .............................. 210/170, 747; 405/36, 43, 50, 52, 266, 267

(56) References Cited

U.S. PATENT DOCUMENTS

| | | | | |
|---|---|---|---|---|
| 320,667 A | * | 6/1885 | Marquis | 405/43 |
| 3,441,140 A | * | 4/1969 | Thurber | 210/170 |
| 4,543,016 A | * | 9/1985 | Tallard | 405/267 |
| 4,793,728 A | * | 12/1988 | Ellis | 405/50 |
| 4,863,312 A | * | 9/1989 | Cavalli | 405/267 |
| 4,988,235 A | * | 1/1991 | Hurley | 405/50 |
| 5,639,364 A | * | 6/1997 | Houck et al. | 210/170 |
| 6,082,928 A | * | 7/2000 | Deniau et al. | 405/50 |

FOREIGN PATENT DOCUMENTS

| | | | |
|---|---|---|---|
| DE | 12 3 111 | | 6/1967 |
| DE | 3741001 | * | 6/1988 |
| EP | 0 439 890 | | 8/1991 |
| EP | 2 750 442 | | 1/1998 |
| WO | 85/02212 | * | 5/1985 |

* cited by examiner

Primary Examiner—Christopher Upton
(74) Attorney, Agent, or Firm—Jacobson Holman, PLLC

(57) ABSTRACT

A draining wall includes a plurality of panels filled with a granular filtering material and separated from each other by intermediate elements cast in the ground, a member, embedded in the lower part of each intermediate element, enabling communication to be established between the panels of each pair of adjacent panels, and auxiliary devices applied into contact with the end faces of the intermediate elements so as to cover the mouth of the communication-enabling members. Each auxiliary device is open on the side applied against the intermediate element, has a height greater than the diameter of the mouth, delimits a volume around the mouth, and has either perforations over at least a part of its surface whose size is smaller than that of the granules constituting the filtering material or an opening to which a perforated pipe acting as a receiver is connected.

9 Claims, 2 Drawing Sheets

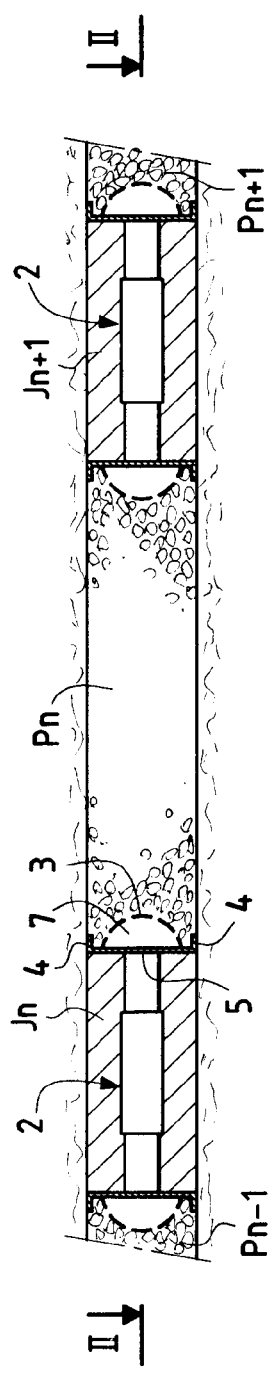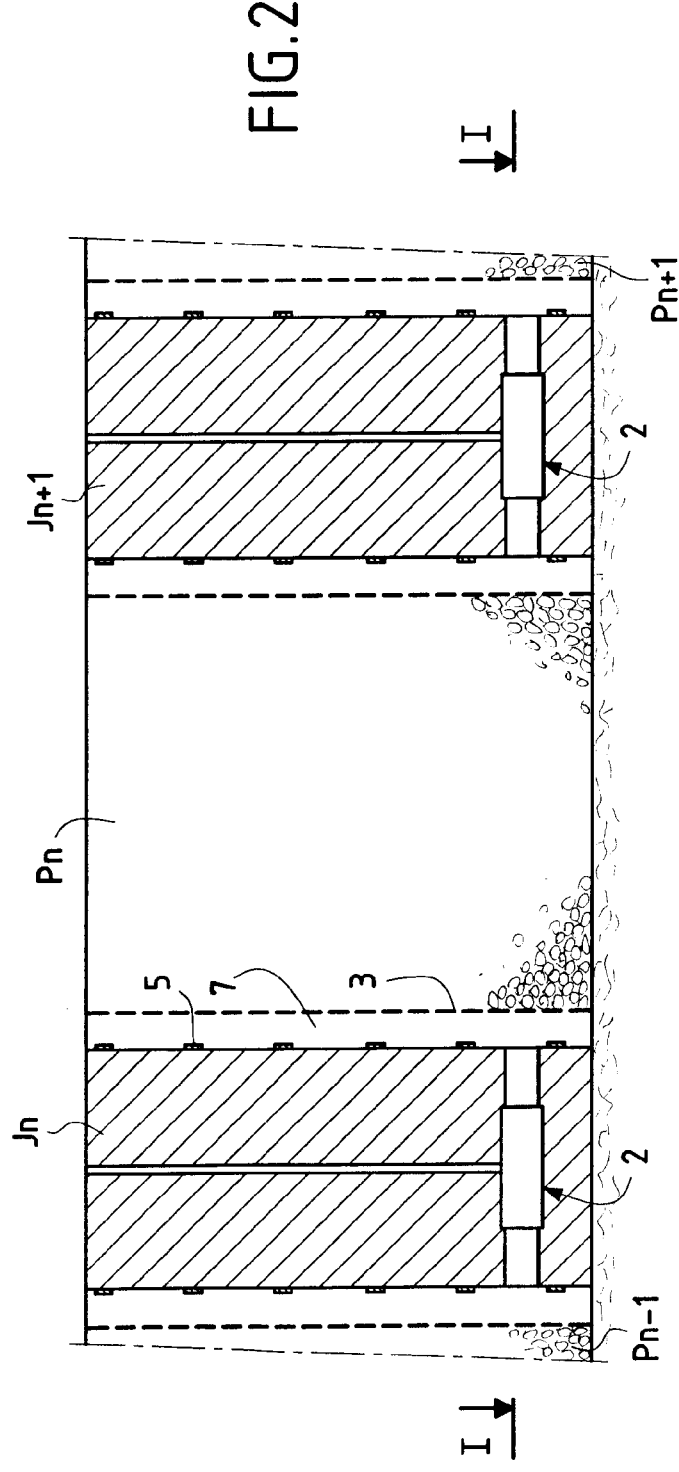
FIG.1
FIG.2

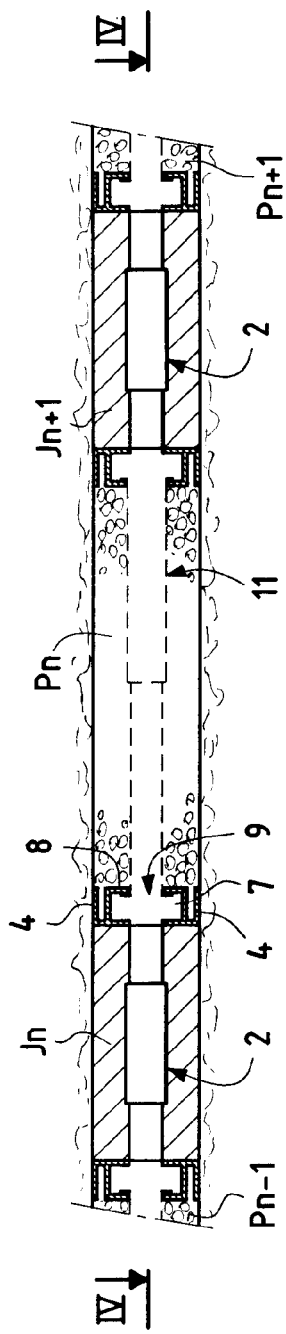
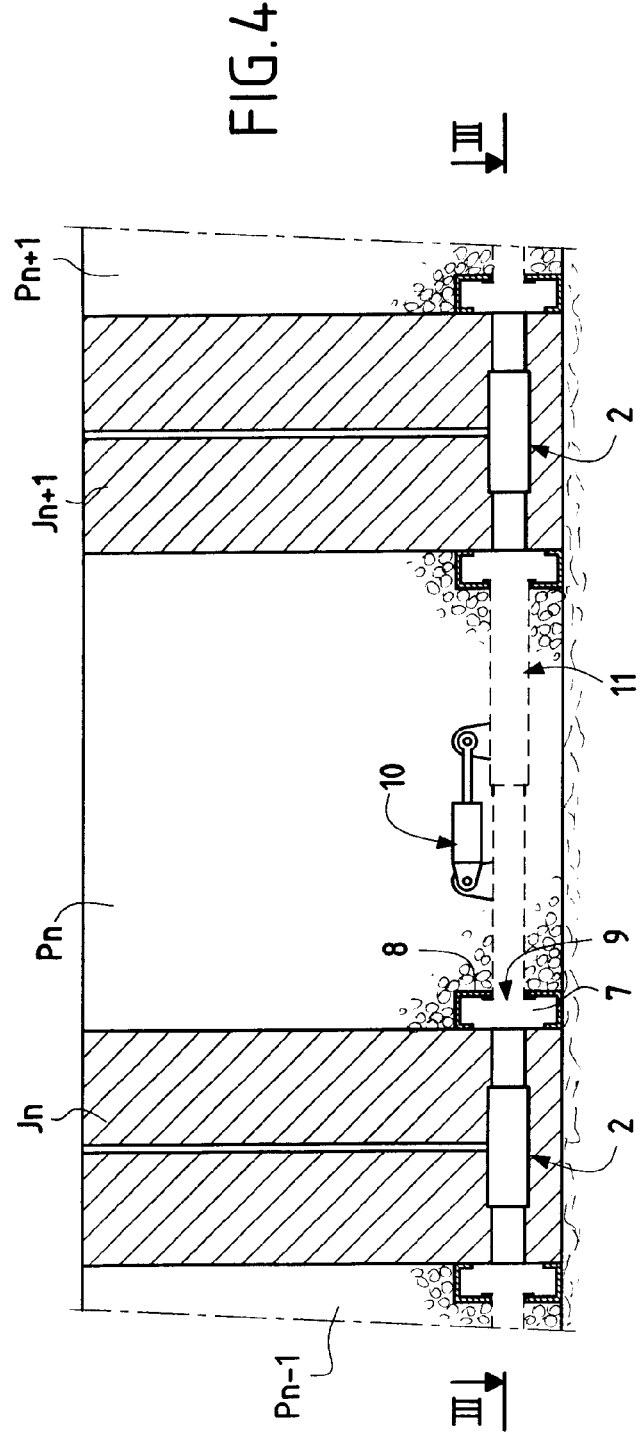

DRAINING WALL

BACKGROUND OF THE INVENTION

1. Field of the Invention

The invention relates to an improved draining wall.

2. Description of the Prior Art

French patent 2 750 442 or its U.S. Pat. No. counterpart 6,082,928 describes and claims a draining wall consisting of a number of elemental panels filled with a filtering material, characterized in that said panels are separated from one another by intermediate elements molded in the soil and in that a member placing each pair of adjacent panels in communication with each other is embedded in the lower part of each intermediate element. The members enabling each pair of adjacent panels to communicate with each other can in particular be a tubular member which has a permanent central tubular part made from a relatively strong material, destructible closed off tubular end parts made from a relatively fragile material, and means for temporarily closing off said central part. French patent 2 750 442 also describes and claims a method of producing a draining wall, which comprises the following steps:

a) producing diggings or excavations spaced along the line of the draining wall to be produced, these diggings or excavations being spaced apart by a distance which more or less corresponds to the length of one elemental panel of the wall and being produced under excavation fluid, b) positioning at the lower part of each of these diggings or excavations a tubular member including a permanent central part and destructible closed-off end parts, said member pointing more or less along the direction of the draining wall to be produced and being slightly shorter than the digging or excavation, c) curing the excavation fluid lying in each of said diggings or excavations or substituting a curable material for this fluid so as to form intermediate elements J1 to Jn made of cured material molded in the soil, d) excavating, under excavation fluid, a first elemental drain T1 between the intermediate elements J1 and J2 obtained in c), and destroying the destructible closedoff end parts of the members embedded at the base of said intermediate elements, which parts point toward said drain, e) filling the length of drain obtained in d) with a filtering material, and removing the excavation fluid which lies in said length of drain in order to obtain a first elemental panel P1, f) closing off the central part of the member embedded in the intermediate element J2 at an arbitrary stage in the method, but before the next step g), g) excavating, under excavation fluid, a second elemental drain T2 between the intermediate elements J2 and J3 obtained in c), and destroying the destructible closed-off end parts of the members embedded at the base of said intermediate elements and facing toward said drain, h) filling the length of drain obtained in g) with a filtering material, and removing the excavation fluid which lies in said length of drain in order to obtain a second elemental panel P2, i) closing off the central part of the member embedded in the intermediate element at an arbitrary stage in the method, but before the next step, and so on until the work is completed, and j) opening the central part of each member embedded in any arbitrary intermediate element at any arbitrary moment after that the excavation fluid lying in the elemental drains situated on either side of this intermediate element has been removed.

If required, the method can further include laying perforated pipes connecting the tubular members of two successive intermediate elements together and acting as receivers before the filtering material is deposited.

Whether perforated pipes acting as receivers are laid or not, carrying out the method described above is not without difficulties. One problem encountered is penetration of the filtering material (usually gravel) into the communication-enabling members. To prevent such penetration grids having a mesh whose size is smaller than the particle size of the gravel have been placed inside the members and in the vicinity of their ends. However, these grids have the disadvantage of reducing the cross section of the communication-enabling members, which impedes the flow of water. Also, the communication-enabling members can be cleaned only from the inside of each member, which is not sufficiently effective.

Another problem exists when perforated pipes acting as receivers are used. In principle, the perforated pipes must be nested inside the communication-enabling members. However, it is very difficult to achieve this in practice because the work must be carried out at great depths (10 to 20 meters or more) and in an excavation fluid, i.e. blind. For this reason, the perforated pipes are often left approximately coincident with the mouths of the communication-enabling members. As a result, there are frequently relatively large gaps between the perforated pipes and the communication-enabling members. This enables the filtering material (gravel) to penetrate between the communication-enabling members and the perforated pipes, with the concomitant risk of partial or total blocking of the communication-enabling members or at least some of them. Even if the perforated elements are nested inside the communication-enabling members, the mediocre geometrical accuracy with which they are manufactured means that there is still a significant risk of gravel penetration and therefore of blockage of the communication-enabling members.

There is therefore a need for an improvement to overcome the above problems.

The present invention aims precisely to provide that improvement.

SUMMARY OF THE INVENTION

To be more precise, the invention provides a draining wall including a plurality of panels filled with a granular filtering material and separated from each other by intermediate elements cast in the ground, and a member, embedded in the lower part of each intermediate element, enabling communication to be established between the panels of each pair of adjacent panels, said wall further including auxiliary devices applied into contact with the end faces of the intermediate elements so as to cover the mouths of the communication-enabling members, wherein each auxiliary device is open on the side applied against the intermediate element, has a height greater than the diameter of the mouth, delimits a volume around the mouth, and has one or the other of the following features:

a) it has over at least a part of its surface perforations whose size is smaller than that of the granules constituting the filtering material, or b) it has an opening to which a perforated pipe acting as a receiver is connected.

In all cases the volume delimited by each auxiliary device is protected from the intrusion of filtering material particles (gravel), which prevents all risk of blocking of the communication-enabling members.

Each auxiliary device having the feature (a) preferably extends to the surface of the ground and is open or can be opened at the top.

In one particular embodiment each auxiliary device has a semi-cylindrical vertical central portion at least a part of which is perforated and flexible lateral sealing elements acting as seals against the granular filtering material between the end face of the intermediate element onto which the auxiliary device is applied and said central portion of the auxiliary device.

Stiffener elements and/or spacer elements are preferably provided to prevent the granular filtering material crushing the auxiliary device.

The auxiliary devices of the invention permit to overcome the difficulty to make accurate connections blind. Because each auxiliary device covers an area of the intermediate element which can be very much greater than the cross section of the communication-enabling member, that element can be positioned so that it is certain to cover the mouth of the communication-enabling member, even if it can only be positioned roughly.

An auxiliary device having the feature (a) is suitable when the draining wall does not include any perforated pipes acting as receivers, whereas an auxiliary device having the feature (b) is suitable when the draining wall includes such perforated pipes.

As indicated hereinabove an auxiliary device having the feature (a) preferably extends to the surface of the ground and is open (or can be opened) at the top. In this way, the auxiliary device forms a kind of chimney, free of granular filtering material, which enables a tool or any other instrument to be inserted from the surface of the ground and as far as the mouth of the communication-enabling member, if required, for example for cleaning, for taking samples of drained water or for measuring any property.

An auxiliary device with the feature (b) is suitable when a perforated pipe acting as a receiver is installed in the lower part of a drainage panel, between two intermediate elements. It is a simple matter to mount each of the ends of the perforated pipe into the opening of an auxiliary device at the surface, and then to lower the resulting assembly into the excavation fluid in the trench until the perforated pipe and the auxiliary devices rest on the trench bottom, ensuring that the auxiliary devices are in contact with or very close to the intermediate elements. Then, when the granular filtering material (for example gravel) is added, the pressure it exerts applies the auxiliary devices tightly against the intermediate elements.

The invention also provides an improved method of producing a draining wall, which method includes the following steps:

a) producing diggings or excavations spaced along the line of said draining wall to be produced, these diggings or excavations being spaced apart by a distance which more or less corresponds to the length of one elemental panel of said wall and being produced under excavation fluid, b) positioning at the lower part of each of these diggings or excavations a tubular member including a permanent central part and destructible closed-off end parts, said member pointing more or less along the direction of said draining wall to be produced and being slightly shorter than said digging or excavation, c) curing said excavation fluid lying in each of said diggings or excavations or substituting a curable material for this fluid so as to form intermediate elements J1 to Jn made of cured material molded in said soil, d) excavating, under excavation fluid, a first elemental drain T1 between the intermediate elements J1 and J2 obtained in c), and destroying said destructible closed-off end parts of said members embedded at said base of said intermediate elements and facing toward said drain, e) filling said length of drain obtained in d) with a filtering material, and removing said excavation fluid which lies in said length of drain in order to obtain a first elemental panel P1, f) closing off said central part of said member embedded in the intermediate element J2 at an arbitrary stage in said method, but before said next step g), g) excavating, under excavation fluid, a second elemental drain T2 between the intermediate elements J2 and J3 obtained in c), and destroying the destructible closed-off end parts of the members embedded at the base of said intermediate elements and facing toward said drain, h) filling said length of drain obtained in g) with a filtering material, and removing said excavation fluid which lies in said length of drain in order to obtain a second elemental panel P2, i) closing off the central part of the member embedded in the intermediate element at an arbitrary stage in said method, but before the next step, and so on until the work is completed, and j) opening said central part of each member embedded in any arbitrary intermediate element at any arbitrary moment after that the excavation fluid lying in the elemental drains situated on either side of this intermediate element has been removed, in which method auxiliary devices are applied into contact with the end faces of said intermediate elements prior to performing steps (e) and (h) of the method and each auxiliary device is open on the side applied against said intermediate element, has a height greater than the diameter of said mouth, delimits a volume around said mouth, and has one or the other of the following features:

a) it has over at least a part of its surface perforations whose size is smaller than that of the granules constituting said filtering material, or b) it has an opening to which a perforated pipe acting as a receiver is connected.

The invention finally provides the above auxiliary devices.

The following description, which refers to the accompanying drawings, explains the present invention.

BRIEF DESCRIPTION OF THE DRAWINGS

FIGS. 1 and 2 are respectively views in horizontal section taken along the line I—I in FIG. 2 and in vertical section taken along the line II—II in FIG. 1 of a first embodiment of an auxiliary device according to the invention.

FIGS. 3 and 4 are respectively views in horizontal section taken along the line III—III in FIG. 4 and in vertical section taken along the line IV—IV in FIG. 3 of a second embodiment of an auxiliary device according to the invention.

DETAILED DESCRIPTION OF THE PREFERRED EMBODIMENTS

FIGS. 1 and 2 show a portion of a draining wall comprising a panel Pn separated from adjacent panels Pn−1 and Pn+1 by intermediate elements Jn and Jn+1 cast in the ground. The adjacent panels communicate with each other, in their lower part, near the bottom, via communication-enabling members 2. An auxiliary device according to the invention is placed against each of the end faces of the intermediate elements Jn, Jn+1 before the filtering gravel is deposited. The device in accordance with the invention includes a vertical semi-cylindrical strainer (perforated metal sheet) 3 extending from the bottom of the panel Pn to the surface of the ground and two flexible lateral sealing elements 4 made of a geotextile woven material, a fine mesh grid or rubber, for example, and fixed to respective opposite sides of the strainer 3, for example by means of angle-irons bolted to the strainer. The function of the sealing elements 4 is to prevent the filtering material infiltrating between the strainer 3 and the end face of the intermediate element against which the strainer is disposed. Stiffeners 5 are provided at appropriate intervals to prevent the gravel crushing the strainer. The gravel presses the sealing elements 4 tightly against the intermediate elements. The strainer 3 could instead be of a shape other than semi-cylindrical.

When the gravel has been deposited, the auxiliary device according to the invention allows a volume 7 that is free of gravel, which prevents any risk of gravel blocking the element 2. The volume 7 further constitutes an easy access path for inserting from the surface of the ground a cleaning tool for cleaning the element 2 or any other instrument.

The device is easy to position because it is sufficient to lower it to the bottom of the excavation, guided by the intermediate element, to be certain that it covers the mouth of the element 2.

FIGS. 3 and 4 show a variant of the device which is useful if a perforated pipe 11 acting as a receiver is installed at the bottom of the excavation between two intermediate elements. This variant includes a generally parallelepiped-shaped box section 8 made of stainless steel, for example, one end face of which is omitted and whose other end face has an opening 9 in it whose geometry and size match those of the perforated pipe. As in the device shown in FIGS. 1 and 2, flexible lateral sealing elements 4 are attached to respective opposite sides of the box section. The height of the box section must be matched to the accuracy with which the device can be placed to be certain of covering the mouth of the communication-enabling member 2. By way of non-limiting example, it can be from twice to three times the diameter of the mouth of the communication-enabling members 2.

This variant is simple to use. Before tipping the filtering gravel into the trench, each end of the perforated pipe is inserted into the opening 9 of an auxiliary device and attached thereto by appropriate means leaving some slack, for example a binding, a chain or bolts in oblong holes. The perforated pipe is advantageously of variable length and designed so that its length can be adjusted at the bottom of the excavation, for example by a telescopic system operated by an actuator 10.

The assembly formed by the perforated pipe and the two auxiliary devices is then lowered into the trench until they rest on its bottom with the box sections applied against the intermediate elements on the side where the face is omitted. To achieve this it is sufficient to operate the actuator of the telescopic system until the box sections abut against the facing end faces of the intermediate elements. Once this has been done, it remains only to tip the gravel into the trench.

Although in the embodiment shown in FIGS. 3 and 4 the box sections are of relatively modest height, it goes without saying that the box sections could extend to the surface of the ground and have an opening at that level to enable the insertion of a tool or instrument, as described with reference to the embodiment shown in FIGS. 1 and 2.

Of course, the invention is not limited to the embodiments described and shown, which are provided by way of non-limiting and illustrative example only.

There is claimed:

1. A draining wall including a plurality of panels filled with a granular filtering material and separated from each other by intermediate elements cast in the ground, and a member, embedded in the lower part of each intermediate element, enabling communication to be established between the panels of each pair of adjacent panels said wall further including auxiliary devices applied into contact with the end faces of said intermediate elements so as to cover the mouths of said communication-enabling members, wherein each auxiliary device is open on the side applied against said intermediate element, has a height greater than the diameter of said mouth, delimits a volume around said mouth, and has one or the other of the following features:
   a) it has over at least a part of its surface perforations whose size is smaller than that of the granules constituting said filtering material, or
   b) it has an opening to which a perforated pipe acting as a receiver is connected.

2. The draining wall claimed in claim 1 when it includes auxiliary devices having said feature (a), wherein said devices extend to the surface of the ground and are open or can be opened at the top.

3. The draining wall claimed in claim 1 wherein each auxiliary device has a semi-cylindrical vertical central portion at least a part of which is perforated and flexible lateral sealing elements acting as seals against said granular filtering material between the end face of said intermediate element onto which said auxiliary device is applied and said central portion of said auxiliary device.

4. The draining wall claimed in claim 3 wherein stiffener elements and/or spacer elements are provided to prevent said granular filtering material crushing said auxiliary device.

5. A method of producing a draining wall, which method includes the following steps:
   a) producing diggings or excavations spaced along the line of said draining wall to be produced, these diggings or excavations being spaced apart by a distance which more or less corresponds to the length of one elemental panel of said wall and being produced under excavation fluid,
   b) positioning at the lower part of each of these diggings or excavations a tubular member including a permanent central part and destructible closed-off end parts, said member pointing more or less along the direction of said draining wall to be produced and being slightly shorter than said digging or excavation,
   c) curing said excavation fluid lying in each of said diggings or excavations or substituting a curable material for this fluid so as to form intermediate elements J1 to Jn made of cured material molded in said soil,
   d) excavating, under excavation fluid, a first elemental drain T1 between the intermediate elements J1 and J2 obtained in c), and destroying said destructible closed-off end parts of said members embedded at said base of said intermediate elements and facing toward said drain,
   e) filling said length of drain obtained in d) with a filtering material, and removing said excavation fluid which lies in said length of drain in order to obtain a first elemental panel P1, f) closing off said central part of said member embedded in the intermediate element J2 at an arbitrary stage in said method, but before said next step g), g) excavating, under excavation fluid, a second elemental drain T2 between the intermediate elements J2 and J3 obtained in c), and destroying the destructible close off end parts of the members embedded at the base of said intermediate elements and facing toward said drain, h) filling said length of drain obtained in g) with a filtering material, and removing said excavation fluid which lies in said length of drain in order to obtain a second elemental panel P2, i) closing off the central part of the member embedded in the intermediate element at an arbitrary stage in said method, but before the next step, and so on until the work is completed, and j) opening said central part of each member embedded in any arbitrary intermediate element at any arbitrary moment after that the excavation fluid lying in the elemental drains situated on either side of this intermediate element has been removed, in which method auxiliary devices are applied into contact with the end faces of said intermediate elements prior to performing steps (e) and (h) of the method and each auxiliary device is open on the side applied against said intermediate element, has a height greater than the diameter of said mouth, delimits a volume around said mouth, and has one or the other of the following features:

a) it has over at least a part of its surface perforations whose size is smaller than that of the granules constituting said filtering material, or b) it has an opening to which a perforated pipe acting as a receiver is connected.

6. The method claimed in claim 5 when it uses auxiliary devices having said feature (a), wherein said devices extend to the surface of the ground and are open or can be opened at the top.

7. The method claimed in claim 5 wherein each auxiliary device has a semi-cylindrical vertical central portion at least a part of which is perforated and flexible lateral sealing elements acting as seals against said granular filtering material between the end face of said intermediate element onto which said auxiliary device is applied and said central portion of said auxiliary device.

8. The draining wall claimed in claim 7 wherein stiffener elements and/or spacer elements are provided to prevent said granular filtering material crushing said auxiliary device.

9. The method claimed in claim 5 further including the step of installing perforated pipes connecting said tubular members of two successive intermediate elements and acting as receivers prior to depositing said filtering material.

* * * * *